United States Patent
Belke (10) Patent No.: US 12,083,530 B2
(45) Date of Patent: Sep. 10, 2024

(54) CRUSHER

(71) Applicant: Jeffrey Victor Belke, Mount Pleasant (AU)

(72) Inventor: Jeffrey Victor Belke, Mount Pleasant (AU)

(*) Notice: Subject to any disclaimer, the term of this patent is extended or adjusted under 35 U.S.C. 154(b) by 376 days.

(21) Appl. No.: 17/439,529

(22) PCT Filed: Mar. 5, 2020

(86) PCT No.: PCT/AU2020/050207
§ 371 (c)(1),
(2) Date: Sep. 15, 2021

(87) PCT Pub. No.: WO2020/186288
PCT Pub. Date: Sep. 24, 2020

(65) Prior Publication Data
US 2022/0152617 A1 May 19, 2022

(30) Foreign Application Priority Data

Mar. 21, 2019 (AU) ................................ 2019900949
Jun. 25, 2019 (AU) ................................ 2019902211

(51) Int. Cl.
B02C 2/04 (2006.01)
B02C 2/02 (2006.01)
B02C 25/00 (2006.01)

(52) U.S. Cl.
CPC ................ B02C 2/04 (2013.01); B02C 25/00 (2013.01)

(58) Field of Classification Search
CPC .. B02C 2/04; B02C 2/047; B02C 2/02; B02C 25/00
See application file for complete search history.

(56) References Cited

U.S. PATENT DOCUMENTS 857,940 A 6/1907 Hoff
3,666,188 A * 5/1972 Lippmann ................ B02C 2/06
241/213
(Continued)

FOREIGN PATENT DOCUMENTS

CN 102327791 1/2012
CN 102327791 A 1/2012
(Continued)

OTHER PUBLICATIONS

Russian Search Report dated Aug. 24, 2022, 2 pages, with English translation, 2 pages, and English version of Russian Examination Report, 6 pages.
(Continued)

Primary Examiner — Mohammed S. Alawadi
(74) Attorney, Agent, or Firm — BainwoodHuang (57) ABSTRACT

There is disclosed a crusher for crushing material into finer particulates, the crusher including a housing that encloses a crushing head mounted on a shaft. The housing supports an outer crushing shell, while the crushing head supports an inner crushing shell. The two crushing shells cooperate to form a crushing gap therebetween. The crusher further includes a drive mechanism joined to the shaft for generating movement of the inner crushing shell relative to the outer crushing shell. The drive mechanism includes at least three drive units joined to the shaft and configured to impart a pulling force on the shaft. Also disclosed is a method of operating the crusher, wherein each of the drive units are selectively activated and deactivated to selectively generate orbital or gyratory movement of the crushing head relative to the outer housing.

20 Claims, 5 Drawing Sheets

(56) References Cited

U.S. PATENT DOCUMENTS

| | | | |
|---|---|---|---|
| 4,615,491 A | 10/1986 | Batch et al. | |
| 2016/0310959 A1* | 10/2016 | Svensson | ................. G01D 5/20 |
| 2018/0021785 A1* | 1/2018 | Belotserkovsky | ........ B02C 2/04 |
| | | | 241/215 |

FOREIGN PATENT DOCUMENTS

| | | | |
|---|---|---|---|
| CN | 106694093 | | 5/2017 |
| CN | 107457028 | | 12/2017 |
| CN | 207102703 | U | 3/2018 |
| DE | 1157459 | B | 11/1963 |
| GB | 786258 | | 11/1957 |
| RU | 2238798 | | 10/2004 |
| RU | 109021 | | 10/2011 |
| RU | 2524094 | | 7/2014 |
| WO | 02089987 | A1 | 11/2002 |
| WO | 2002089987 | | 11/2002 |
| WO | 2005051546 | | 6/2005 |
| WO | WO-2005094996 A1 * | 10/2005 | ............... B02C 2/04 |

OTHER PUBLICATIONS

Extended European Search Report for application No. 20773700.8-1016/3941635 PCT/AU2020050207, dated Dec. 9, 2022, 8 pages.

\* cited by examiner

CRUSHER

TECHNICAL FIELD

The present disclosure relates to a crusher.

More particularly, the present disclosure relates to a drive mechanism for a crusher.

BACKGROUND

Crushers, such as cone crushers and gyratory crushers, are used to crush ore or large rocks into smaller rocks, gravel or dust. The crushers can also be used for recycling waste material such as for crushing plastics material into finer particulates. Typically, a crusher has a housing supporting an outer crushing shell and in which is located a crushing head supporting an inner crushing shell. The crushing head is moved to crush the feed ore between the outer crushing shell and the inner crushing shell. The desired size of the finer particulate matter is regulated by setting the minimum width of a crushing gap formed between the outer and inner crushing shells.

One type of cone crusher utilises an eccentric member to cause movement of the crushing head. The shaft of the crushing head is mounted in the eccentric member and, during use, the eccentric member causes the shaft to move along a predefined path to cause movement of the crushing head. Prior art examples of such eccentric drives can be seen in U.S. Pat. Nos. 5,115,991 and 5,718,391. One problem encountered with the use of such an eccentric member is that it is cumbersome to change the predefined path of movement of the shaft—normally this requires the cone crusher to be dismantled so that the eccentric member can be exchanged for another. It is often also difficult to adjust the minimum size of the crushing gap between the housing and the crushing head.

In another type of cone crusher the crushing head rests in a spherical bearing and its shaft is held in a cylindrical sleeve having an unbalanced mass attached thereto. By rotating the cylindrical sleeve, the unbalanced mass is rotated and this causes it to swing radially outwardly due to centrifugal forces acting on the sleeve—which in turn causes the crushing head to gyrate within the spherical bearing. The gyration path (and the crushing gap) can be selectively changed by either altering the speed of rotation of the sleeve, by altering the mass of the unbalanced mass, or by changing the distance between the unbalanced mass and the sleeve. Prior art examples of such unbalanced mass drives can be seen in U.S. Pat. Nos. 8,870,105 and 8,960,577. One problem that may be encountered in using an unbalanced mass is that the rotational movement of the mass causes excessive vibrations in the cone crusher leading in increased wearing of its parts.

CN 207102703 also discloses a gyratory (inertia) cone crusher equivalent to the above but being further provided with a cavity protection device. Its drive mechanism includes a pulley that drives a transmission shaft so that torque is transmitted to the main shaft of the crushing head, thereby to cause rotation of the unbalanced mass to generate the breaking force. The cavity protection device is in the form of a shock absorber located around the crushing head and configured to prevent the crushing head from directly contacting the crushing shell should the movement of the crushing head become too extreme. It is described that the shock absorbers are preferably elastic rubber air springs, but they can also be hydraulic cylinders. However, these hydraulic cylinders do not impart driving force to the crushing head as any such force would conflict with the breaking force generated by the unbalanced mass.

It is to be understood that, if any prior art publication is referred to herein, such reference does not constitute an admission that the publication forms a part of the common general knowledge in the art, in Australia or any other country.

SUMMARY OF THE DISCLOSURE

According to a first aspect of the disclosure, there is provided a crusher for crushing material into finer particulates, the crusher comprising
  a housing supporting an outer crushing shell;
  a crushing head located within the housing and being mounted on a shaft, the crushing head supporting an inner crushing shell that cooperates with the outer crushing shell to form a crushing gap therebetween; and
  a drive mechanism comprising at least three drive units joined to the shaft and being configured to generate movement of the inner crushing shell relative to the outer crushing shell.

The drive mechanism may be configured to generate movement of the crushing head by imparting only a pulling force on the shaft. The crushing head may be supported on a spherical bearing which may include one or more bearing pads. The drive units may be configured to be selectively activated to generate movement of the crushing head relative to the housing. In some embodiments the drive units are located within the housing, whereas in other embodiments the drive units are located outside the housing.

The crusher may include a coupling mounted on the shaft, with each drive unit being joined to the coupling via a tie rod. Each tie rod may be pivotally joined to the coupling and may be pivotally joined to its drive unit. Each tie rod may be joined to the coupling and its drive unit via universal joints or constant-velocity joints.

The crusher may include a counterweight mounted on the shaft, wherein the counterweight is spaced away from the crushing head and wherein the drive units are joined to the shaft between the crushing head and the counterweight. The counterweight may be connected to the shaft and configured to rotate together with the crushing head. Alternatively, the counterweight may be connected to the shaft but configured to rotate independently from the crushing head. In some embodiments the counterweight may be integrally formed with the coupling.

Each of the drive units may be one of a hydraulic cylinder, a linear motor and a solenoid.

When the drive units are hydraulic cylinders, the drive mechanism may include a hydraulic circuit being configured to selectively activate each of the cylinders. The hydraulic circuit may include a proportional directional control valve being configured to control flow of hydraulic fluid into or out from each cylinder. In one embodiment the control valve is a three-position pilot operated proportional directional control valve. The control valve may be configured in a failsafe default configuration to open its tank port and close its pump port.

The hydraulic circuit may be configured that when one of the cylinders is selectively activated, the pulling force exerted by that activated cylinder operates to exhaust hydraulic fluid from other cylinders.

The hydraulic circuit may include a bleed fluid line leading from each cylinder, wherein during use each bleed fluid line is configured to bleed off a portion of hydraulic fluid from its cylinder and wherein the hydraulic circuit is replenished by fresh hydraulic fluid. Such replacement of the portion of the hydraulic fluid may assist in regulating a temperature of the hydraulic fluid in the hydraulic circuit.

Each cylinder may be associated with one or more bearing pads, with each bleed fluid line leading from its cylinder to the bearing pads so that, in use, the portion of hydraulic fluid flowing through the bleed fluid line is ejected between the bearing pads and the crushing head. Each bleed fluid line may lead to a distribution manifold for dispersing hydraulic fluid to any one or more of all the bearing pads. In such case, the crusher may include one-way valves provided between each of the cylinders and the distribution manifold, the valves being configured to prevent hydraulic fluid flowing from the distribution manifold back to the cylinders.

The hydraulic circuit may be operable to adjust a pressure of the hydraulic fluid within the cylinders, thereby to select a desired operational crushing pressure to be exerted by the crushing head during use. The hydraulic circuit may be operable to adjust a volume of the hydraulic fluid within the cylinders, thereby to select a desired operational width of the crushing gap during use.

The crusher may include a positional sensing mechanism being configured to determine an operative position of the crushing head within the housing. The positional sensing mechanism may be any one of (a) each drive unit being a position sensing drive unit configured to detect a position of its actuator; (b) a proximity sensor being associated with each drive unit, wherein the proximity sensors are configured to detect the proximity of the shaft to their associated drive units; and (c) an angular sensor configured to detect the angular position and orientation of the shaft within the housing.

The crusher may be a cone crusher or a gyratory crusher.

According to a second aspect of the disclosure, there is provided a coupling for use in a crusher as described in the first aspect.

According to a third aspect of the disclosure, there is provided a tie rod for use in a crusher as described in the first aspect.

According to a fourth aspect of the disclosure, there is provided a hydraulic cylinder for use in a crusher as described in the first aspect.

According to a fifth aspect of the disclosure, there is provided a method of operating a crusher having a housing supporting an outer crushing shell and further having a crushing head located within the housing and being mounted on a shaft, the crushing head supporting an inner crushing shell that cooperates with the outer crushing shell to form a crushing gap therebetween, the method comprising the step of
    joining a drive mechanism comprising at least three drive units to the shaft for generating movement of the inner crushing shell relative to the outer crushing shell.

The method may include the step of having the drive mechanism generating movement of the crushing head by imparting only a pulling force on the shaft. The method may include the step of selectively activating each of the drive units to generate movement of the crushing head relative to the housing.

Each of the drive units may be one of a hydraulic cylinder, a linear motor and a solenoid. When the drive units are hydraulic cylinders, the method may include the step of utilising a force exerted by a cylinder that is selectively activated to exhaust hydraulic fluid from other cylinders. The method may include the step of replacing a portion of hydraulic fluid used in the hydraulic drive mechanism when each of the cylinders is selectively activated. Such replacement of the portion of the hydraulic fluid may assist in regulating a temperature of the hydraulic fluid. The crushing head may be supported on a bearing, wherein the method includes the step of ejecting the portion of hydraulic fluid between the bearing and the crushing head.

The method may include the step of adjusting a pressure of hydraulic fluid used in the hydraulic drive mechanism to thereby select a desired crushing pressure to be exerted by the crushing head.

Each cylinder may include a piston reciprocally movable between an inner position proximal to the shaft and an outer position distal to the shaft, wherein the method further includes the steps of selectively activating and deactivating each of the cylinders to generate orbital or gyratory movement of the crushing head relative to the outer crushing shell, wherein each cylinder is activated while its piston is moving from its inner position towards its outer position and each cylinder is deactivated while its piston is moving from its outer position towards its inner position.

In the method, the step of activating each of the cylinders may include injecting hydraulic fluid into each respective cylinder thereby to apply movement force to its piston and the step of deactivating each of the cylinders may include permitting the passive movement of each piston to exhaust hydraulic fluid from its cylinder. The method may include the steps of activating each cylinder after its piston moves past its inner dead centre position and deactivating each cylinder after its piston moves past its outer dead centre position.

The method may include the steps of providing a processing unit having a memory module and of storing a minimum inner dead centre position for each piston and a maximum outer dead centre position for each piston in the memory module.

The method may include the step of programming the processing unit with a desired operational crushing pressure to be exerted by the crushing head, whereby during use the processing unit is arranged to adjust the pressure of hydraulic fluid injected into the cylinders to obtain the desired operational crushing pressure.

Alternatively, the method may include the step of programming the processing unit with a desired operational displacement of the crushing head, whereby during use the processing unit is arranged to adjust the volume of hydraulic fluid injected into the cylinders to obtain the desired operational displacement. In such case the volume of hydraulic fluid injected into the cylinders may be selectively increased to increase the extent of movement of the crushing head and decreased to decrease the extent of movement of the crushing head.

Alternatively, the method may include the step of programming the processing unit
    with a desired operational crushing pressure to be exerted by the crushing head,
    with a desired operational displacement of the crushing head, and
    with a selection hierarchy between the crushing pressure and the displacement,
    whereby during use the processing unit is arranged to adjust both the pressure and the volume of hydraulic fluid injected into the hydraulic cylinders until the first of the desired crushing pressure and desired displacement is achieved.

One or more position sensors may be associated with the drive units, wherein the method may include the step of determining the operative position of the crushing head within the housing.

The drive units may be spaced substantially equidistantly around the shaft. The method may include the step of activating the drive units consecutively in a desired order around the shaft. The drive mechanism may include at least five drive units and, in some embodiments, the method may include the step of concurrently activating at least two of the drive units.

The method may be used for operating a cone crusher or a gyratory crusher.

BRIEF DESCRIPTION OF DRAWINGS

The above and other features will become more apparent from the following description and with reference to the accompanying schematic drawings. In the drawings, which are given for purpose of illustration only and are not intended to be in any way limiting, there is shown in.

DETAILED DESCRIPTION

The present disclosure relates to a crusher that is used for crushing solid material, such as ore, and more particularly to a drive mechanism for such a crusher. The crusher will typically be a cone crusher or a gyratory crusher.

Figure 1:
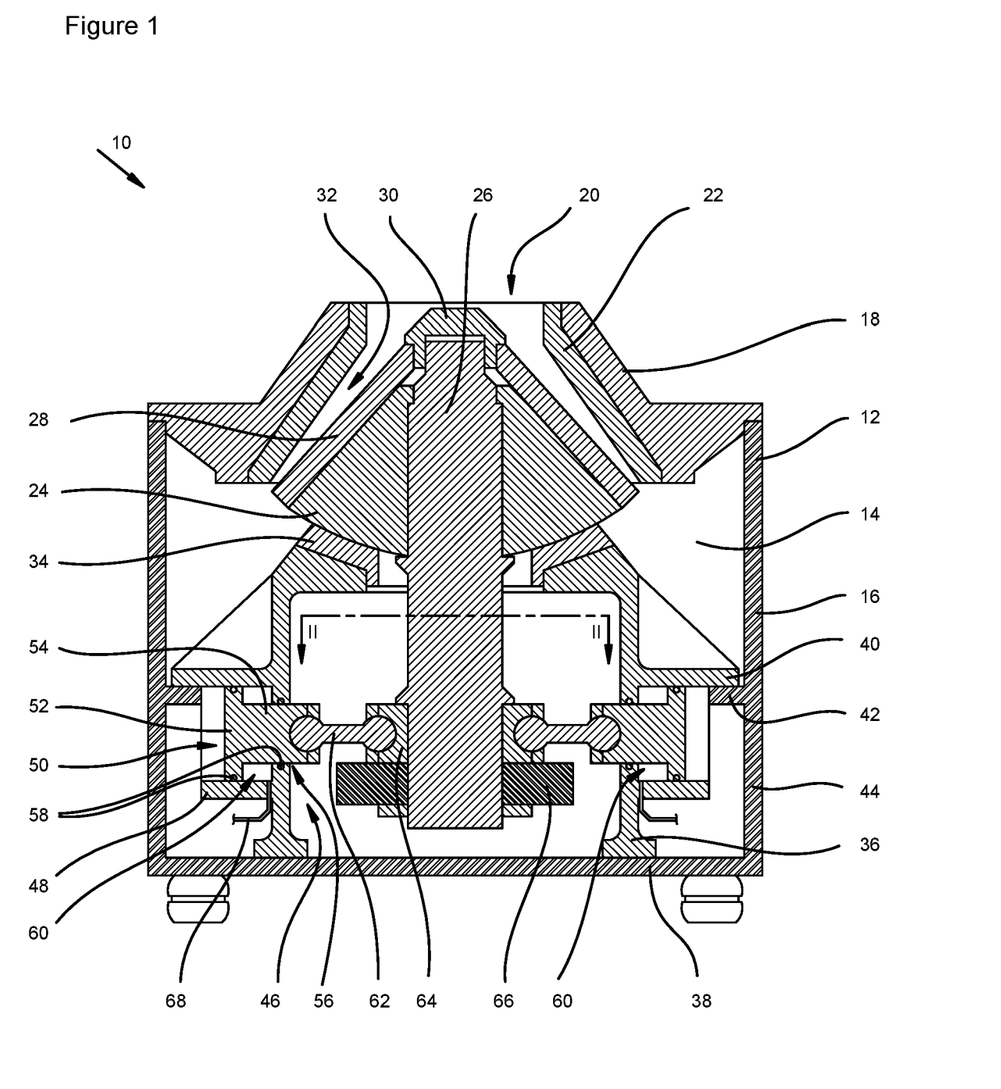
FIG. 1 is a cross-sectional side view of a first embodiment of a cone crusher.
Figure 2:
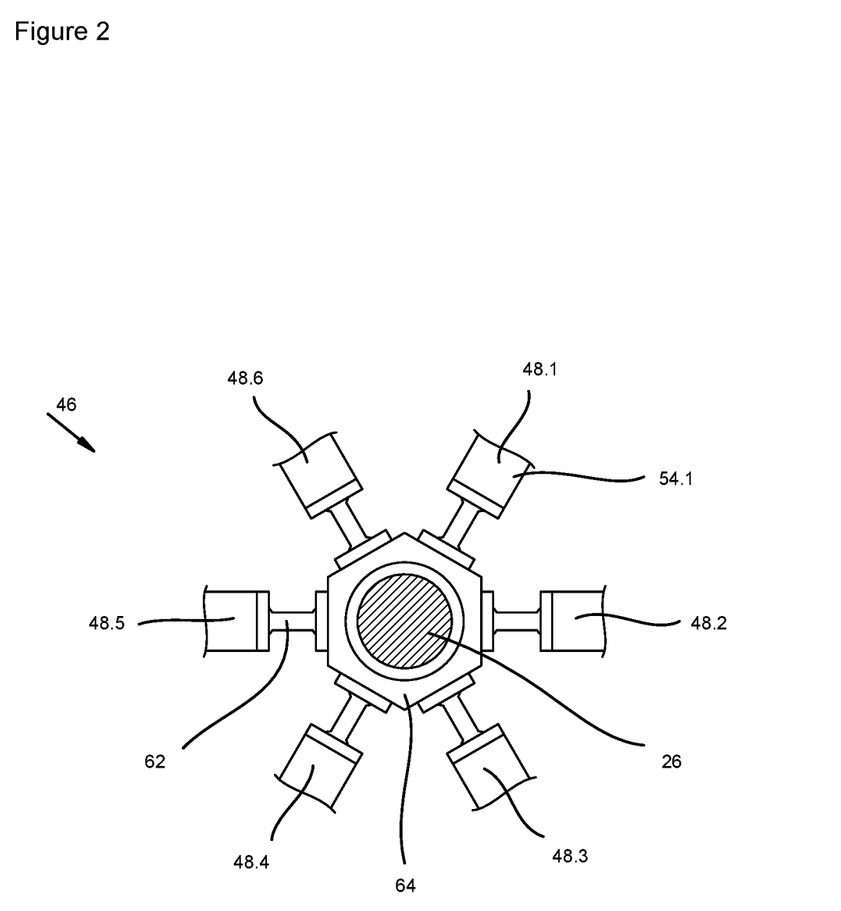
FIG. 2 is a partial top view of a drive arrangement for the cone crusher seen along arrows II-II in FIG. 1.

Referring to FIGS. 1 and 2 of the drawings there is shown a first embodiment of a cone crusher 10 which is used, for example, for crushing coarse ore into finer particle size ore. The cone crusher 10 comprises a housing 12 defining a chamber 14 for containing the various operational parts of the cone crusher 10. The housing 12 includes a lower bowl body 16 that is closed at its upper end by a removable lid 18. A frusto-conical opening 20 extends through the lid 18, through which opening 20 the feed ore can pass into the chamber 14 during use.

A frusto-conical outer crushing shell 22 (also known in the art as a bowl liner) is supported by the housing 12 so as to line the opening 20.

A crushing head 24 is located inside the chamber 14 with the crushing head 24 being mounted on a shaft 26. The crushing head 24 is conical in shape and extends at least partially into and/or through the opening 20. The crushing head 24 supports an inner crushing shell 28 (also known in the art as a mantle) that is secured in place by a cap 30 being joined to the shaft 26. Alternatively, the inner crushing shell 28 can be secured to the crushing head 24 by any other conventional methods. Yet further, in some embodiments the inner crushing shell 28 can be integrally formed as part of the crushing head 24. The space between the outer crushing shell 22 and the inner crushing shell 28 defines a crushing gap 32. Due to the outer crushing shell 22 having a narrower cone angle than that of the inner crushing shell 28, the crushing gap 32 is wider near the outer side of the lid 18 and narrower near the inner side of the lid 18.

Both the outer crushing shell 22 and the inner crushing shell 28 are wear items and are configured to be replaced when needed. Although not shown in the drawings, the position of lid 18 and/or the crushing head 24 are able to be adjusted, whereby lid 18 can be moved closer to or further from crushing head 24 to provide one method of adjusting the size of the crushing gap 32.

The crushing head 24 is movably supported within the chamber 14 on a spherical support or bearing 34 which itself is mounted on an inner frame 36. The bearing 34 can be made of a single bearing pad or the bearing 34 can comprise multiple bearing pads. In the latter case, the bearing pads can be positioned directly adjacent to each other or spaced slightly apart from each other.

The inner frame 36 is substantially cylindrical and stands on a floor 38 of the bowl body 16. Inner frame 36 has an outwardly projecting flange 40 located approximately midway along its height, which is arranged to rest on and be joined to a collar 42 projecting inwardly from a side wall 44 of the bowl body 16 to fix the inner frame 36 to the bowl body 16.

Inner frame 36 supports a drive mechanism 46 that is joined to shaft 26 for causing gyratory movement of the crushing head 24. During use this movement is normally of either an orbital or a gyratory nature. The drive mechanism 46 comprises a number of drive units that, in the exemplary embodiment, are hydraulic cylinders 48 and pistons 50 being spaced around the shaft 26. It is envisaged that the drive mechanism 46 will generally have between three and ten cylinders 48, however, it may be that additional cylinders need to be provided to operate very large cone crushers 10. In FIG. 2 of the drawings the cone crusher 10 is shown having six cylinders 48 but it is generally expected that five cylinders will suffice for most situations and in FIG. 3 the hydraulic circuit only shows five cylinders. In FIG. 1, the cylinders 48 are shown being integrally formed with inner frame 36. However, it should be appreciated that in other embodiments the cylinders 48 can be separately formed and subsequently joined to the inner frame 36 or to the housing 12 (an example of the latter will be described below with reference to FIG. 4).

Each cylinder 48 houses a piston head 52 from which its piston rod 54 extends through an orifice 56 in the inner frame 36 towards the shaft 26. The pistons 50 are reciprocally movable within the cylinders 48 between an inner position proximal to the shaft 26 and an outer position distal to the shaft 26. Sealing rings 58 are respectively provided surrounding the piston head 52 and the piston rod 54 so that a sealed cylinder chamber 60 is formed on the side of the piston head 52 closest to the shaft 26. The sealing rings 58 prevent hydraulic fluid from escaping from the cylinder chamber 60, either out past the piston head 52 or past the piston rod 54. At its terminal end the piston rod 54 is joined to one end of a tie rod 62. The opposed end of the tie rod 62 is joined to a coupling 64 mounted on the shaft 26.

The exemplary embodiment shows a simplified configuration of the tie rod 62 and coupling 64, wherein the tie rod 62 is a double ball headed tie rod (e.g. shaped like a dumbbell) that has each of its balls being held in respective spherical recesses in the piston rod 54 and in the coupling 64. The opposed spherical heads of the tie rod 62 enable the tie rod 62 to pivot through a limited extent relative to both the piston rod 54 and the coupling 64 during operative reciprocal movement of their pistons 50 within their cylinders 48.

In alternative more complex configurations, the tie rods 62 can be joined to the piston rod 54 and the coupling 64 using any one of the known universal joints or constant-velocity joints, such as a Tracta joint, a Rzeppa joint, a Weiss joint, a Cardan joint or double Cardan joint, a Thompson coupling or a Malpezzi joint. In some instances, the tie rods 62 can be joined directly to their piston heads 52.

It will be appreciated that the above arrangement of the pistons 50 and tie rods 62 will, during use, result in the pistons 50 imparting a pulling force on the tie rods 62 to move the shaft 26 towards the respective cylinders 48. Nevertheless, the scope of this disclosure also considers the possibility of changing the above arrangement so that a converse pushing force can be imparted on the tie rods 62 to move the shaft 26 towards the respective cylinders 48. This can be achieved by simply locating the sealed cylinder chamber 60 on the side of the piston head 52 furthest from the shaft 26. However, the application of a pulling force is preferred over a pushing force as it reduces potential damage to the tie rods 62. For example, a pushing force could result in buckling or bending in the tie rods 62. Also, in some instances, a pushing force can tend to rotate the coupling 64 around the shaft 26, which would dissipate some of the energy from the hydraulic drive mechanism 46 and result in a reduced crushing force being applied by the crushing head 24.

In some embodiments the shaft 26 carries a counterweight 66 being arranged to offset the mass of the crushing head 24. The counterweight 66 can be connected to the shaft 26 so that it rotates together therewith and, accordingly, with the crushing head 24. Alternatively, the counterweight 66 can be rotatable on the shaft 26 so that it can rotate independently from the crushing head 24.

A hydraulic fluid line 68 leads from a reservoir tank (not shown) to each cylinder chamber 60 whereby hydraulic fluid can be pumped into or exhausted from the cylinder chamber 60, thereby to cause movement of the piston 50.

Figure 3:
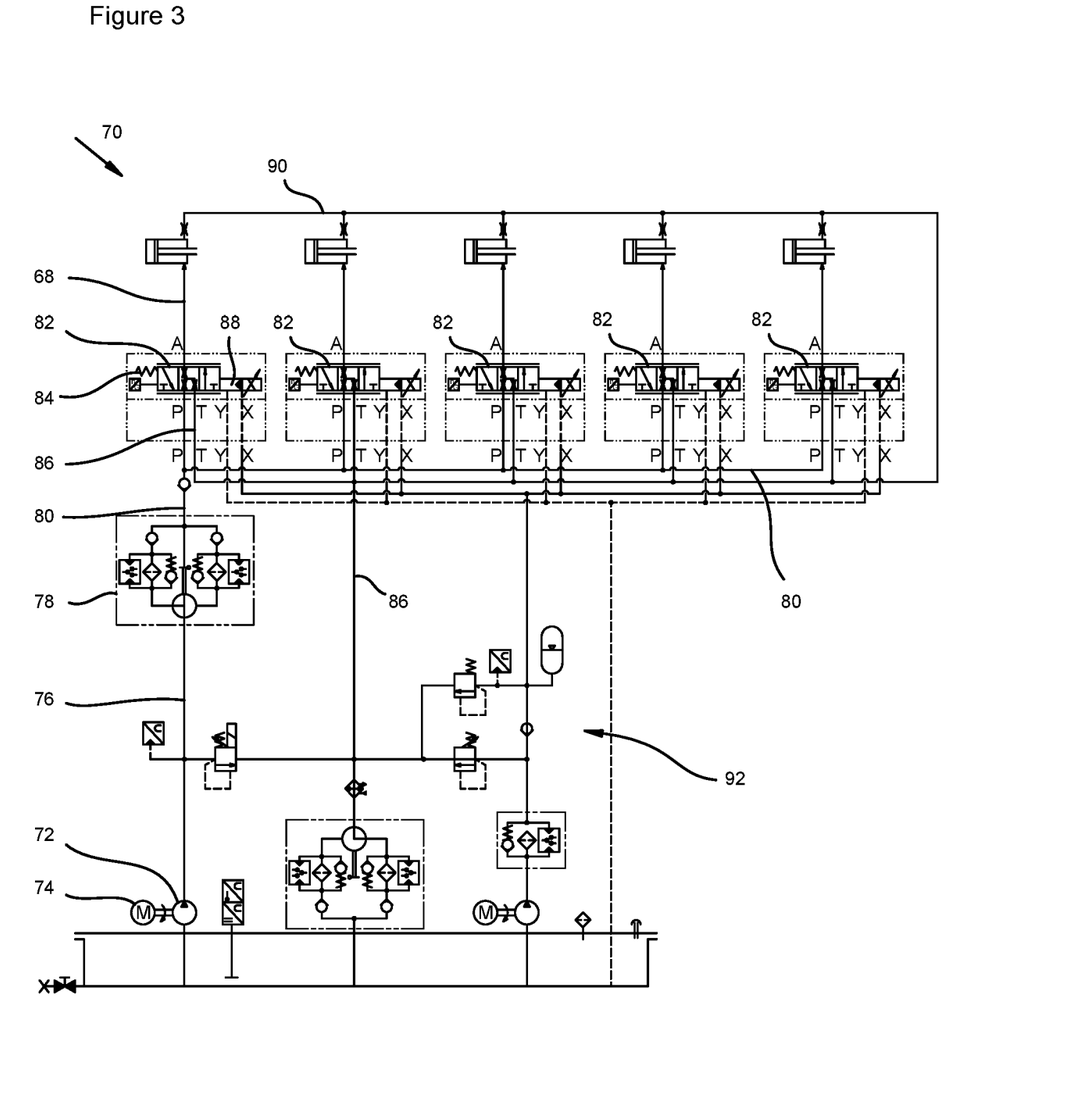
FIG. 3 is a schematic of the hydraulic circuitry for the cone crusher.

Referring now to FIG. 3, there is shown an embodiment of a hydraulic circuit 70 for operating the cone crusher 10 wherein the drive mechanism 46 is configured to achieve approximately a 40 kN pulling force on the tie rods 62. A skilled addressee will be able to adapt this hydraulic circuit to provide up to 150 kN pulling force. A hydraulic pump 72 driven by motor 74 supplies the hydraulic fluid into the hydraulic circuit 70 under a pressure of about 300 bar. It is expected that there will be certain pressure losses through the various valves in the hydraulic circuit 70 depending on the types of valves selected, resulting in the pressure in the cylinders 48 being approximately 255 bar.

The output of pump 72 is led via fluid line 76 through a filter 78, whereafter the fluid line 76 is divided through manifold line 80 into the requisite number of parallel banks of control valves 82. It should be understood that each cylinder 48 has a unique control valve 82 associated therewith, i.e. when the drive mechanism 46 includes six cylinders 48 (as shown in FIGS. 1 and 2) then there will be six control valves 82, whereas when the drive mechanism 46 includes five cylinders 48 then there will be five control valves 82 (as shown in FIG. 3). In other embodiments, each cylinder 48 may be operated using two control valves.

Each control valve 82 is a three-position pilot operated proportional directional valve configured to control flow of the hydraulic fluid into its associated cylinder chamber 60. Valve spool of control valve 82 is biased by spring 84 to its first (left) default position to close off pump port P so that fluid in the cylinder chamber 60 is able to be exhausted through cylinder port A and tank port T via fluid line 68 leading from the cylinder chamber 60 and fluid line 86 leading to the reservoir tank. In the second (central) position of control valve 82 all its ports A, P and T are open so that fluid pressure is equalised across the control valve 82. In the third (right) position of control valve 82 tank port T is closed and pump port P is opened to allow fluid flow through cylinder port A and fluid line 68 into cylinder chamber 60. Movement of the valve spool is controlled by a solenoid operated pilot head 88 that, when suitably pressurised, overcomes the biasing force of spring 84. It should be understood that the middle and right positions are essentially the same in that the control valve 82 is a proportional valve meaning that it is not just open or shut; the middle and right positions describe the control valve 82 as being partially open to the degree of bias from its fully middle position to its fully right position.

Each cylinder 48 is further provided with a bleed fluid line 90 (not shown in FIGS. 1 and 2), which is configured to bleed off a small portion volume of the hydraulic fluid from the cylinder chamber 60 that is exhausted to the reservoir tank. This bleeding of the hydraulic fluid functions to change out a small percentage volume of the hydraulic fluid to ensure that an equivalent volume of fresh hydraulic fluid is drawn from the reservoir tank into the hydraulic circuit 70. In some embodiments it is expected that the hydraulic fluid will experience a temperature increase during operation due to the high pressures being exerted thereon. Changing out the hydraulic fluid will assist in regulating the hydraulic fluid temperature and keeping it more constant because the fresh hydraulic fluid drawn from the reservoir tank will be at a cooler temperature than the hydraulic fluid withdrawn from the cylinder chamber 60. In some embodiments the bleed fluid line 90 can be provided with a valve to close of the line to prevent flow of hydraulic fluid. However, in the exemplary embodiment the bleed fluid line 90 has no valve and hydraulic fluid can flow at all times, wherein the volume of be hydraulic fluid flowing through bleed fluid line 90 is dependent on the cross-sectional size of the bleed fluid line 90 as well as the pressure of hydraulic fluid within the cylinder chamber 60. Thus, in the present example, more hydraulic fluid will flow through the bleed fluid line 90 whilst its associated cylinder 48 is being activated (i.e. with its control valve 82 in its middle or right positions), whilst less hydraulic fluid will flow through the bleed fluid line 90 whilst its associated cylinder 48 is being exhausted (i.e. with its control valve 82 in its left position. The bleed fluid line 90 can optionally include a one-way valve to prevent hydraulic fluid from flowing from the bleed fluid line 90 into the cylinder chamber 60.

The hydraulic circuit 70 further includes additional hydraulic components being generally indicated by arrow 92 (such as valves, accumulators and pumps) that function to operate the respective pilot heads 88 of the control valves 82.

Figure 4:
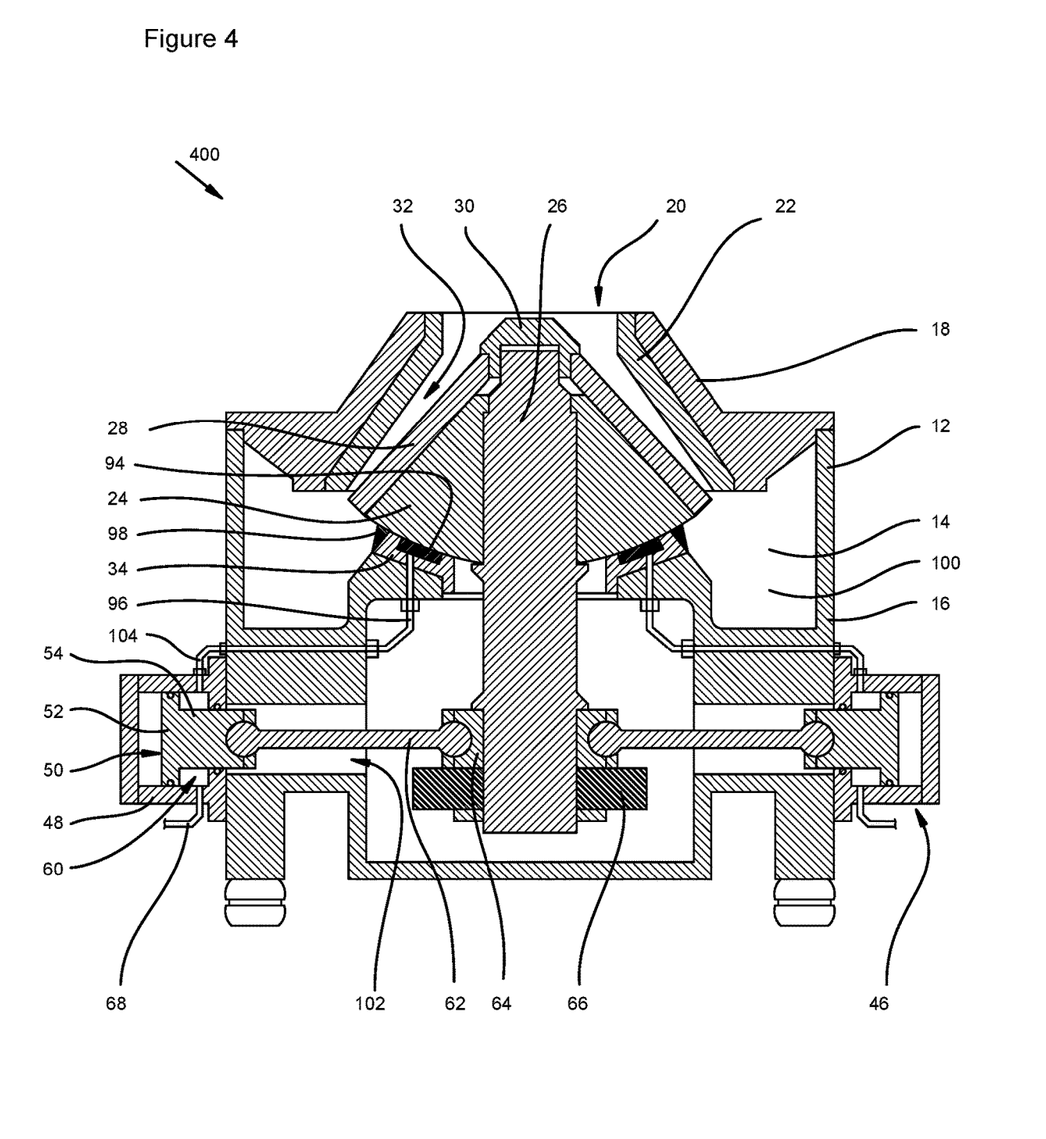
FIG. 4 is a cross-sectional side view of a second embodiment of a cone crusher.

FIG. 4 shows a second embodiment of a cone crusher 400 which includes substantially the same features as the cone crusher 10 of FIG. 1 and accordingly, similar parts will be indicated with the same reference numerals.

In the cone crusher 400 the crushing head 24 is movably supported within the chamber 14 on a spherical support or bearing 34 which is supported by the bowl body 16. The bearing 34 includes a number of bearing pads 94 having openings therein to allow the injection of hydraulic fluid between the bearing 34 and the crushing head 24. As will be later described, the hydraulic fluid is used to lubricate and lift the crushing head 24 up from the bearing 34 thereby to assist in reducing friction between these parts. The hydraulic fluid is fed to the bearing pads 94 via fluid line 96. A peripheral seal 98 extends around the crushing head 24 to prevent leakage of the hydraulic fluid into a discharge area 100 of chamber 14 receiving the crushed ore that passes through the crushing gap 32.

Further, in the cone crusher 400, the hydraulic drive mechanism 46 is directly supported by the housing 12 on an outside thereof, i.e. outside the chamber 14. Having the cylinders 48 mounted externally on the housing 12 allows easier access to the cylinders 48 in comparison to those of the first embodiment shown in FIG. 1, for example in the event that maintenance is required. Additionally, it also eases the coupling of hydraulic pipes and conduits to the cylinder 48. In this case the piston rods 54 and tie rods 62 extend from each cylinder 48 through passages 102 passing through the bowl body 16 towards the shaft 26.

FIG. 4 further shows bleed fluid line 104 (being equivalent to the bleed fluid line 90 referenced in FIG. 3) leading from the cylinder chamber 60 and extending through the bowl body 16 to join in flow communication with the fluid line 96.

The cone crusher 400 has one bearing pad 94 being associated with each of the cylinders 48, whereby in use the hydraulic fluid exiting the cylinder chamber 60 through bleed fluid line 104 is pumped to its associated bearing pad 94 and used for lifting the crushing head 24. If needed, a pressure regulator can be provided in bleed fluid line 104 to reduce the pressure of the hydraulic fluid therein. In other embodiments each cylinder 48 may be associated with multiple bearing pads 94 with the bleed fluid line 104 arranged to disperse the hydraulic fluid between each of its associated bearing pads 94. In some examples the bleed fluid line 104 can lead to a distribution manifold (not shown), wherein hydraulic fluid can be dispersed to any one or more of all the bearing pads 94 in the bearing 34—in such case, one-way valves are provided between each of the cylinders 48 and the distribution manifold, the valves being configured to prevent hydraulic fluid flowing from the distribution manifold back to the cylinders 48; this is to prevent hydraulic fluid flowing from the activated cylinder to other cylinders from which hydraulic fluid is being drained to the reservoir tank.

During operation, the hydraulic circuit 70 selectively activates and deactivates each of the cylinders 48 consecutively in order, i.e. neighbouring cylinders 48, to cause the individual cylinders 48 of the drive mechanism 46 to cyclically pull their pistons 50 away from the shaft 26. In so doing, the pistons 50 respectively cyclically pull the shaft 26 away from its centre axis towards the respective cylinders 48 and thereby cause the crushing head 24 to swivel in an orbital motion within the spherical bearing 34 to close the crushing gap 32 between the inner crushing shell 28 and the outer crushing shell 22. Alternatively, the hydraulic circuit 70 may be adjusted to selectively activate and deactivate each of the cylinders 48 consecutively in a star or criss-cross order so that the pistons 50 respectively pull the shaft 26 away from its centre axis towards the respective cylinders 48 and thereby cause the crushing head 24 to move in a gyratory or erratic motion within the spherical bearing 34.

When orbital motion is desired, each cylinder 48 is activated while its piston 50 is moving from its inner position towards its outer position and each cylinder 48 is deactivated while its piston is moving from its outer position towards its inner position. The step of activating each of the cylinders 48 is performed by injecting hydraulic fluid into each respective cylinder 48 thereby to apply movement force to its piston 50. Conversely, the step of deactivating each of the cylinders 48 is performed by stopping such fluid injection and permitting the movement of each piston 50 to exhaust the hydraulic fluid from its cylinder 48. Accordingly, each cylinder 48 is activated after its piston 50 moves past its inner dead centre position and is deactivated after its piston 50 moves past its outer dead centre position.

Feed ore is deposited through the opening 20 so that it falls into the crushing gap 32 where it is crushed between the inner crushing shell 28 and the outer crushing shell 22 and disintegrates into a finer particulate product which is then withdrawn from the cone crusher 10, i.e. from the discharge area 100, in a conventional manner.

The cone crusher 10 enables a varying crushing pressure to be applied by the crushing head 24 by controlling the pulling force applied to the shaft 26 by the pistons 50, e.g. by changing the operating pressure of the hydraulic fluid pumped into the cylinder chambers 60. In a similar manner, the cone crusher 10 also enables the size of the crushing gap 32 to be adjusted by controlling the distance that the shaft 26 is pulled towards the cylinders 48, e.g. by changing the volume of the hydraulic fluid pumped into the cylinder chambers 60. For example, in one configuration, moving the pistons 50 to their full extent through the cylinders 48 causes the crushing gap 32 to be closed and the inner crushing shell 28 will contact against the outer crushing shell 22; whereas moving the pistons 50 to only halfway through the cylinders 48 causes the crushing gap 32 to remain open with the inner crushing shell 28 still being spaced apart from the outer crushing shell 22. The size of the crushing gap 32 can also be adjusted in conventional manner by moving lid 18 closer to crushing head 24 (or vice versa).

The required crushing pressure may be calculated based on the material composition of the feed ore being introduced through the opening 20. The crushing pressure may be increased for feed ore having a high density or hardness, whereas the crushing pressure may be reduced for a feed ore having a lower density or hardness.

The operation of the hydraulic circuit 70 is simplified in that the cylinders 48 are spaced from each other around the shaft 26. In some examples the cylinders 48 can be spaced substantially equidistantly from each other around the shaft 26, e.g. being radially spaced in some cases. In other examples the cylinders 48 can be spaced at specific selected distances from each other around the shaft 26. Accordingly, it is not necessary for the hydraulic circuit 70 to actively pump the hydraulic fluid out of the cylinder chambers 60. Rather, the pulling force exerted by an activated cylinder operates to exhaust hydraulic fluid from any of the other cylinders. This can be more clearly understood by referring to FIG. 2, wherein when a first cylinder 48.1 (of which only its piston rod 54.1 is shown in FIG. 2) is activated to pull on the shaft 26, i.e. when its control valve 82 is switched to either its second (central) or third (right) position, the remaining cylinders 48.2-48.6 will have their control valves 82 switched into their first (left) positions so that the pulling operation of the first cylinder 48.1 will cause the hydraulic fluid to be exhausted from some of the remaining cylinders. It will be appreciated that in such case the cylinder 48.4 being furthest from or diametrically opposed to the first cylinder 48.1 will experience the greatest exhaust rate. This operation will be repeated cyclically as each of the cylinders 48 are activated in turn.

As mentioned above, as the hydraulic fluid is exhausted from the cylinder chambers 60, the majority thereof will exit through the fluid line 68, while a small portion thereof will be bled off through bleed fluid line 104, which smaller portion is pumped to its associated bearing pad 94 and used for the lifting of the crushing head 24.

In another example, a cylinder 48.*n* whose piston 50.*n* is fully retracted may have its piston 50.*n* held in such fully retracted position until the operatively following cylinder 48.*n*+1 has its piston 50.*n*+1 reach its fully retracted position. For example, once piston 50.1 is fully retracted to its outer dead centre position within cylinder 48.1, piston 50.1 is held remaining in such outer dead centre position until piston 50.2 reaches and is held in its outer dead centre position within cylinder 48.2, whereafter piston 50.1 is released and piston 50.2 is held at its outer dead centre position until piston 50.3 is retracted and reaches its outer dead centre position.

The cone crusher 10 further includes a processing unit (not shown) used to control the hydraulic circuit 70. In one embodiment, the processing unit is able to determine the positional status of the pistons 50 within their cylinders 48 and to thereby calculate the position of the crushing head 24 on or within the spherical bearing 34 by using a position algorithm. This will typically be done by attaching one or more position sensors to some of or all the cylinders 48 to detect the position of the piston heads 52 within their respective cylinders 48. In another embodiment, the cone crusher 10 optionally further includes a positional sensing mechanism being configured to determine the operative position of the crushing head 24 on or within the spherical bearing 34, alternatively doing so by detecting the angular position and orientation of the shaft 26 within the housing 12. In one example, the positional sensing mechanism may include a proximity sensor being configured to detect the proximity of the tie rods 62 and/or the shaft 26 to their associated cylinders 48. In another example, the positional sensing mechanism may include an angle sensor configured to detect the angular position of the shaft 26. In yet a further example, the positional sensing mechanism may include a camera configured to perform image analysis to determine the position of the crushing head 24.

The processing unit of the cone crusher 10 may be programmed to detect if there are any blockages in the crushing gap 32. Such blockages would typically arise due to tramp material entering through the opening 20 and becoming lodged between the inner crushing shell 28 and the outer crushing shell 22. The detection of such blockages can be made by comparing the actual position of the crushing head 24 determined by the position sensing mechanism with the expected position that the crushing head 24 should be in when certain of the control valves 82 are fully or partially open. If there is an offset between the actual position and the expected position, then the processing unit will determine that a blockage exists and the processing unit can then restrict the flow or pressure of the hydraulic fluid to prevent excessive damage to the inner crushing shell 28 and the outer crushing shell 22. Such regulation of the hydraulic fluid flow or pressure will provide a form of active control. In another example, providing passive control, the hydraulic circuit 70 may include a pressure relief valve wherein the hydraulic fluid pressure is limited to a certain value, namely whereby the hydraulic fluid flowing towards the cylinders 48 is diverted through the pressure relief valve back to the reservoir tank to thereby avoid the pistons 50 pulling the shaft 26 to the preselected position.

The processing unit can be programmed with a desired operational crushing pressure to be exerted by the crushing head 24, whereby during use the processing unit is arranged to adjust the pressure of hydraulic fluid injected into the hydraulic cylinders 48 to obtain the desired operational crushing pressure.

Alternatively, the processing unit can be programmed with a desired operational displacement of the crushing head 24, whereby during use the processing unit is arranged to adjust the volume of hydraulic fluid injected into the cylinders 48 to obtain the desired operational displacement. In such case the volume of hydraulic fluid injected into the cylinders 48 may be increased to increase the orbital movement of the crushing head 24 and the volume of hydraulic fluid injected into the cylinders 48 may be decreased to decrease the extent of the orbital movement of the crushing head 24.

In yet a further alternative, the processing unit can be programmed with both a desired operational crushing pressure to be exerted by the crushing head 24 and with a desired operational displacement of the crushing head 24. In such case the processing unit will also be programmed with a selection hierarchy between the crushing pressure and the displacement, whereby during use the processing unit is arranged to adjust both the pressure and the volume of hydraulic fluid injected into the cylinders 48 until either the desired crushing pressure or the desired displacement is achieved.

Figure 5:
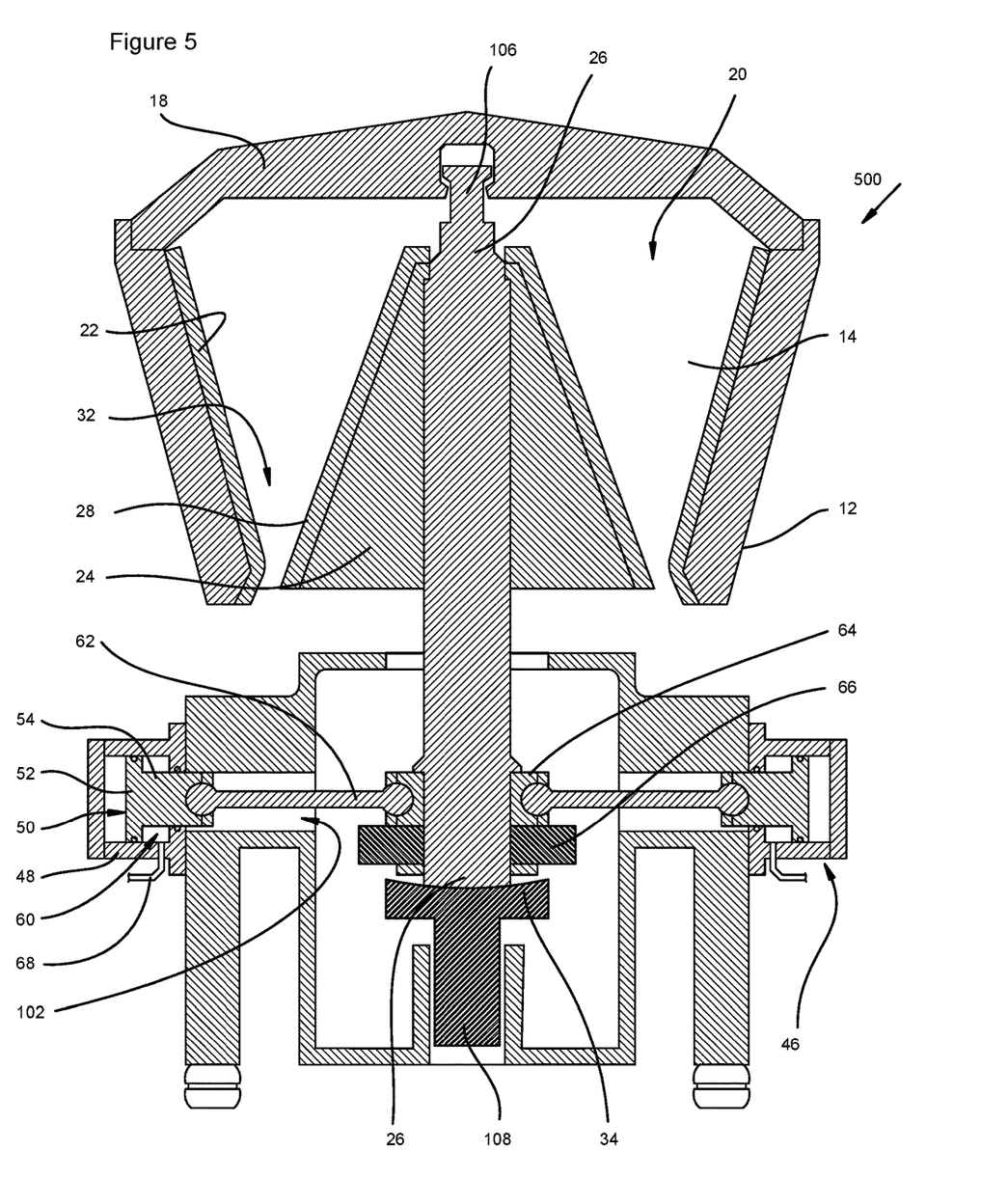
FIG. 5 is a cross-sectional side view of a gyratory crusher.

FIG. 5 shows an embodiment of a gyratory crusher 500 which includes substantially the same features as the cone crusher 10, 400 of FIGS. 1 and 4 and accordingly, similar parts will be indicated with the same reference numerals. In the gyratory crusher 500 the frusto-conical housing 12 is inverted so that the opening 20 has its widest part is at the top and the narrowest part at the bottom. The lid 18 rests on the housing 12 and is arranged to provide a fulcrum for the shaft 26 at pivot 106. The shaft 26 has a spherically curved base that is supported on spherical bearing 34. In use, the drive mechanism 46 pulls on shaft 26 so that crushing head 24 gyrates on bearing 34 around pivot 106 and crushes ore between the outer crushing shell 22 and the inner crushing shell 28. Bearing 34 is mounted on an adjustment piston 108 that can be raised or lowered in a conventional manner to thereby raise or lower shaft 26 and crushing head 24 within the housing 12 to adjust the operational width of the crushing gap 32. The further operation of the drive mechanism 46 will be the same as described above in relation to FIGS. 1 to 4.

It will be appreciated by persons skilled in the art that numerous variations and/or modifications may be made to the crusher as shown in the specific embodiments without departing from the spirit or scope of the disclosure as broadly described. The present embodiments are, therefore, to be considered in all respects as illustrative and not restrictive.

For example, the tie rods 62 can be provided in any other form that will allow the piston rods 54 to be pivotally joined to the coupling 64. In this regard the tie rods 62 can be hinge connected to both the piston rods 54 and the coupling 54. Alternatively, the tie rods can have end fittings in the form of ball joints as are found on link arms of a three-point hitch for being mounted on a pin.

Furthermore, it should be understood that the hydraulic cylinders may be substituted by suitable alternative drive units, for example whereby each of the drive units is a suitable mechanical or electric drive units such as a linear motor or solenoid. In such case each drive unit will have an actuator being joined to the tie rods 62.

In the claims which follow and in the preceding description, except where the context requires otherwise due to express language or necessary implication, the word "comprise" or variations such as "comprises" or "comprising" is used in a non-limiting and an inclusive sense, i.e. to specify the presence of the stated features but not to preclude the presence or addition of further features in the various embodiments of the crusher. A reference to an element by the indefinite article "a" does not exclude the possibility that more than one of the elements is present, unless the context clearly requires that there be one and only one of the elements.

The invention claimed is:

1. A crusher for crushing material into finer particulates, the crusher comprising
   a housing supporting an outer crushing shell;
   a crushing head located within the housing and being mounted on a rotatable shaft, the crushing head supporting an inner crushing shell that cooperates with the outer crushing shell to form a crushing gap therebetween;
   a coupling mounted on the rotatable shaft, whereby the coupling is able to rotate around the rotatable shaft, and
   a drive mechanism comprising at least three drive units joined to the coupling and being configured to generate movement of the inner crushing shell relative to the outer crushing shell.

2. The crusher as claimed in claim 1, wherein the drive mechanism is configured to generate movement of the crushing head by imparting only a pulling force on the rotatable shaft.

3. The crusher as claimed in claim 1, wherein the drive units are configured to be selectively activated to generate movement of the crushing head relative to the housing.

4. The crusher as claimed in claim 1, wherein the drive units are located within the housing.

5. The crusher as claimed in claim 1, comprising a counterweight mounted on the rotatable shaft, wherein the counterweight is spaced away from the crushing head and wherein the coupling is mounted onto the rotatable shaft between the crushing head and the counterweight.

6. The crusher as claimed in claim 1, wherein each of the drive units are hydraulic cylinders, and the drive mechanism comprises a hydraulic circuit being configured to selectively activate each of the cylinders.

7. The crusher as claimed in claim 6, wherein the hydraulic circuit is operable to adjust a pressure of the hydraulic fluid within the cylinders, thereby to select a desired operational crushing pressure to be exerted by the crushing head during use.

8. The crusher as claimed in claim 6, wherein the hydraulic circuit is operable to adjust a volume of the hydraulic fluid within the cylinders, thereby to select a desired operational width of the crushing gap during use.

9. The crusher as claimed in claim 1, further comprising a positional sensing mechanism being configured to determine an operative position of the crushing head within the housing.

10. The crusher as claimed in claim 9, wherein the positional sensing mechanism comprises any one of (a) each drive unit being a position sensing drive unit configured to detect a position of its actuator; (b) a proximity sensor being associated with each drive unit, wherein the proximity sensors are configured to detect the proximity of the rotatable shaft to their associated drive units; and (c) an angular sensor configured to detect the angular position and orientation of the rotatable shaft within the housing.

11. The crusher as claimed in claim 1, wherein the crusher is a cone crusher.

12. The crusher as claimed in claim 1, wherein the crusher is a gyratory crusher.

13. A method of operating a crusher having a housing supporting an outer crushing shell and further having a crushing head located within the housing and being mounted on a rotatable shaft, the crushing head supporting an inner crushing shell that cooperates with the outer crushing shell to form a crushing gap therebetween, the method comprising:
   mounting a coupling on the rotatable shaft, whereby the coupling is able to rotate around the rotatable shaft, and
   joining a drive mechanism comprising at least three drive units to the coupling for generating movement of the inner crushing shell relative to the outer crushing shell.

14. The method as claimed in claim 13, which includes the step of having the drive mechanism generating movement of the crushing head by imparting only a pulling force on the rotatable shaft.

15. The method as claimed in claim 13, which includes the step of selectively activating each of the drive units to generate movement of the crushing head relative to the housing.

16. The method as claimed in claim 13, wherein one or more position sensors are associated with the drive units and wherein the method includes the step of determining the operative position of the crushing head within the housing.

17. A method of operating a crusher having a housing supporting an outer crushing shell and further having a crushing head located within the housing and being mounted on a rotatable shaft, the crushing head supporting an inner crushing shell that cooperates with the outer crushing shell to form a crushing gap therebetween, the method comprising
   mounting a coupling on the rotatable shaft, whereby the coupling is able to rotate around the rotatable shaft,
   joining a drive mechanism comprising at least three drive units to the coupling for generating movement of the inner crushing shell relative to the outer crushing shell; and
   selectively activating each of the drive units to generate movement of crushing head relative to the housing,
   wherein the drive units are hydraulic cylinders operable by a hydraulic drive mechanism, and wherein the method includes the step of replacing a portion of hydraulic fluid used in the hydraulic drive mechanism when each of the cylinders is selectively activated.

18. The method as claimed in claim 17, wherein the crushing head is supported on a bearing, and wherein the method includes the step of ejecting the portion of hydraulic fluid between the bearing and the crushing head.

19. The method as claimed in claim 17, which includes the step of adjusting a pressure of hydraulic fluid used in the hydraulic drive mechanism to thereby select a desired crushing pressure to be exerted by the crushing head.

20. The method as claimed in claim 17, wherein each cylinder comprises a piston reciprocally movable between an inner position proximal to the rotatable shaft and an outer position distal to the rotatable shaft, and wherein the method includes the steps of selectively activating and deactivating each of the cylinders to generate orbital or gyratory movement of the crushing head relative to the outer crushing shell, wherein each cylinder is activated while its piston is moving from its inner position towards its outer position and each cylinder is deactivated while its piston is moving from its outer position towards its inner position.

* * * * *